(12) United States Patent
Bushey

(10) Patent No.: US 9,339,953 B2
(45) Date of Patent: May 17, 2016

(54) METHOD OF MAKING A FORMED FELT DEVICE

(76) Inventor: Richard D. Bushey, Kenosha, WI (US)

( * ) Notice: Subject to any disclaimer, the term of this patent is extended or adjusted under 35 U.S.C. 154(b) by 1370 days.

(21) Appl. No.: 12/367,033

(22) Filed: Feb. 6, 2009

(65) Prior Publication Data

US 2009/0194907 A1    Aug. 6, 2009

Related U.S. Application Data

(62) Division of application No. 11/109,327, filed on Apr. 19, 2005, now abandoned.

(60) Provisional application No. 60/564,389, filed on Apr. 22, 2004.

(51) Int. Cl.
| | |
|---|---|
| *B29C 43/02* | (2006.01) |
| *A47B 95/04* | (2006.01) |
| *B29C 43/52* | (2006.01) |
| *B29K 105/08* | (2006.01) |

(52) U.S. Cl.
CPC .............. *B29C 43/02* (2013.01); *A47B 95/043* (2013.01); *B29C 2043/525* (2013.01); *B29K 2105/0854* (2013.01)

(58) Field of Classification Search
None
See application file for complete search history.

(56) References Cited

U.S. PATENT DOCUMENTS

| | | | | |
|---|---|---|---|---|
| 2,521,984 | A | * | 9/1950 | Lang ................................ 55/486 |
| 2,899,703 | A | | 8/1959 | Johnson |
| 3,050,770 | A | | 8/1962 | Morse et al. |
| 3,362,040 | A | | 1/1968 | Gurzenda |
| 3,484,891 | A | | 12/1969 | Borgen |
| 3,969,786 | A | | 7/1976 | Peak |
| 3,994,043 | A | | 11/1976 | Gurzenda |
| 4,067,632 | A | * | 1/1978 | Sekerich ..................... 312/334.9 |
| D368,022 | S | | 3/1996 | Angle |
| 5,581,844 | A | | 12/1996 | Raheb et al. |
| 5,603,141 | A | | 2/1997 | Gledhill |
| 5,689,853 | A | | 11/1997 | Lemmer |
| 6,295,697 | B1 | | 10/2001 | Simon |
| 6,499,187 | B2 | | 12/2002 | Hollingsworth |
| 2004/0266292 | A1 | * | 12/2004 | Gassan et al. ................... 442/59 |

* cited by examiner

*Primary Examiner* — Benjamin Schiffman
(74) *Attorney, Agent, or Firm* — Boyle Fredrickson, S.C.

(57) ABSTRACT

A bumper for protecting a contact point of a surface from engagement with an object and a method of fabricating the same are provided. The bumper includes a shell having first and second ends, an outer surface, and an inner surface defining a passageway through the shell between the first and second ends. A resilient material is positioned in the passageway and extends between the first end and the second end of the shell.

17 Claims, 2 Drawing Sheets

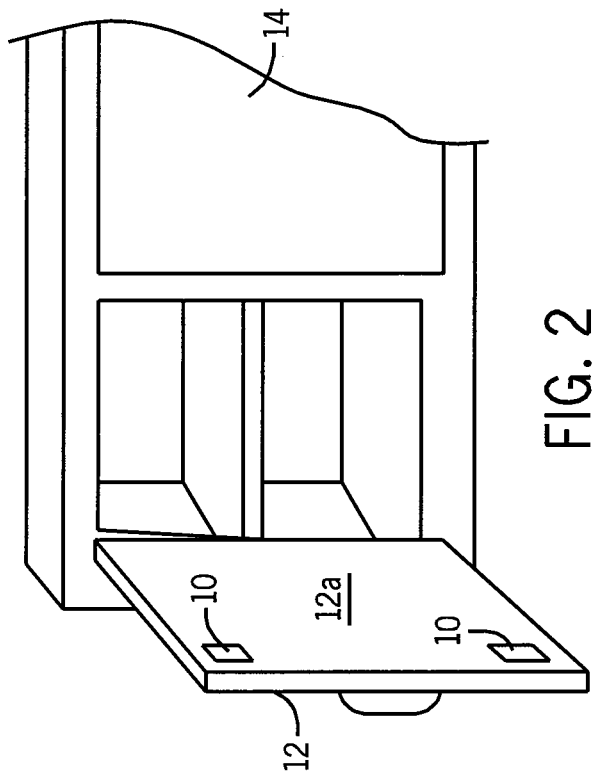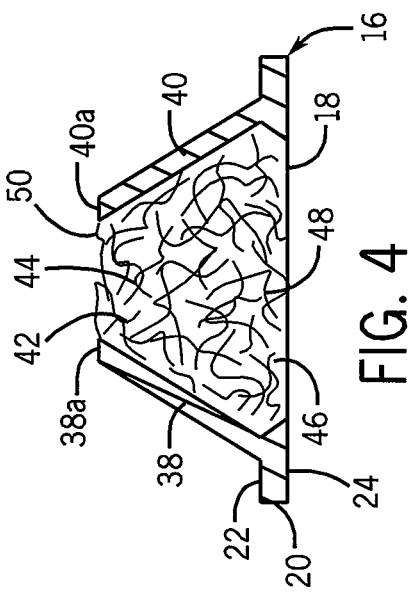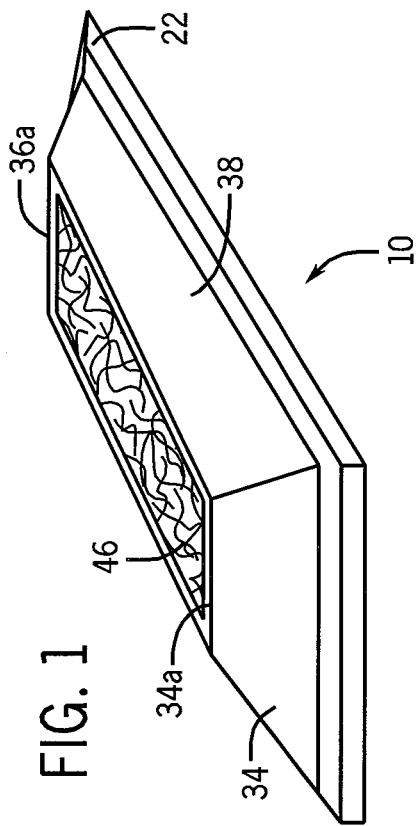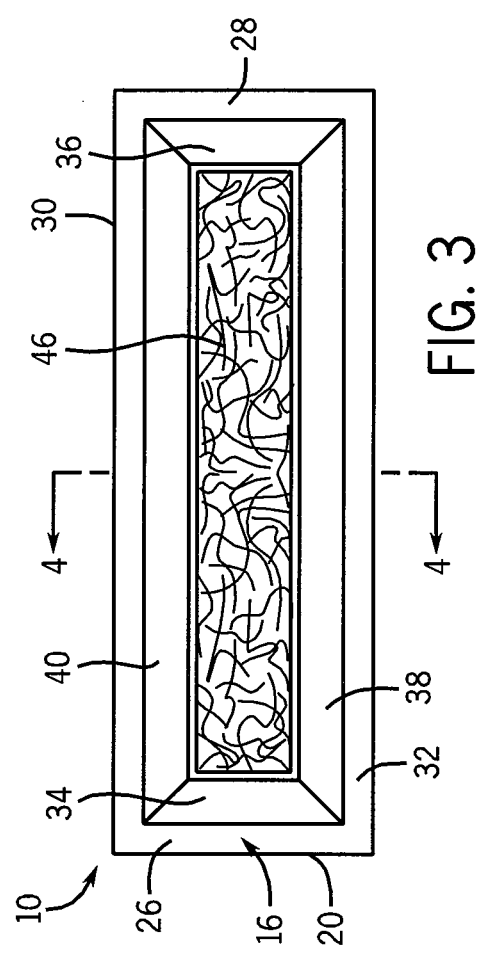

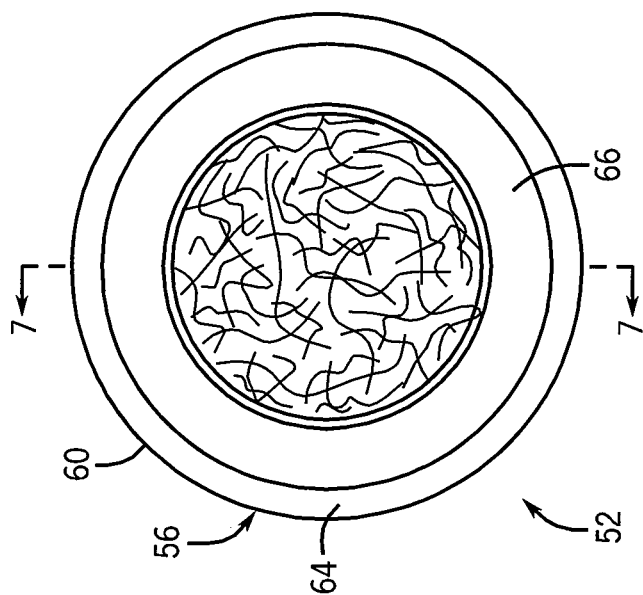
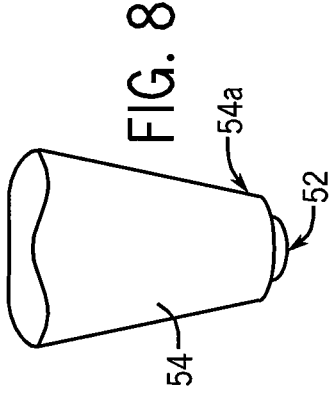
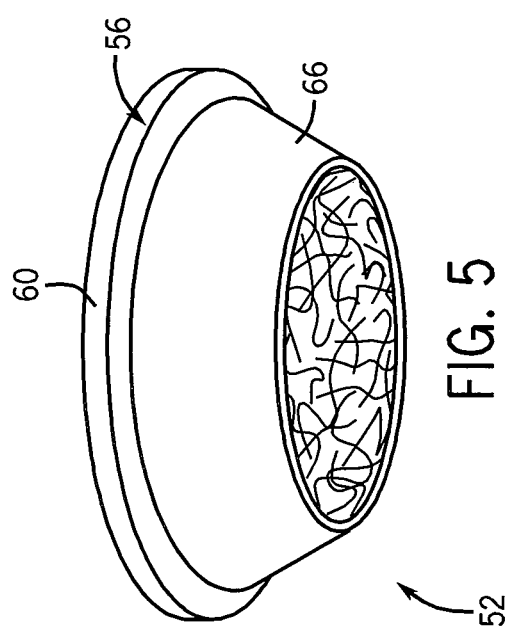
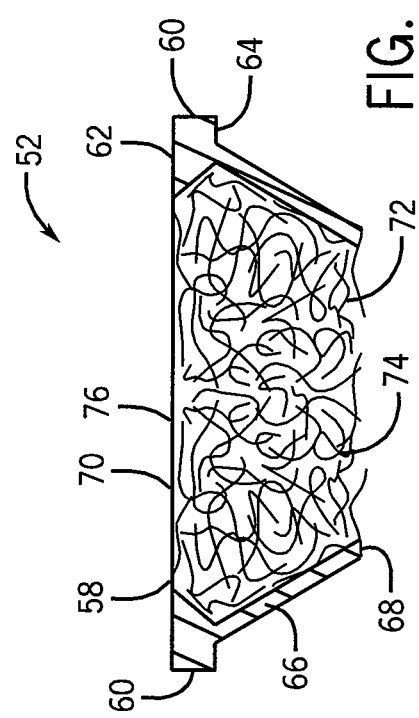

METHOD OF MAKING A FORMED FELT DEVICE

CROSS-REFERENCE TO RELATED APPLICATIONS

This application is a divisional of application Ser. No. 11/109,327 filed Apr. 19, 2005 now abandoned.

This application claims the benefit of U.S. Provisional Application Ser. No. 60/564,389, filed Apr. 22, 2004.

FIELD OF THE INVENTION

This invention relates generally to surface protection products, and in particular, to a felt device for protecting a surface such as the contact point of a door or a drawer of a piece of furniture or the terminal end of a furniture leg, as well as, a method of making the same.

BACKGROUND AND SUMMARY OF THE INVENTION

Furniture glides or sliders are mounted to the terminal ends of the legs of a piece of furniture to act as a buffer between the legs and the surface on which the piece of furniture rests. Typically, furniture glides take the form of convex felt discs having a flat bottom that rest on the surface. These discs are mounted to the furniture legs by means of adhesive, nails or the like. Similarly, bumpers are often provided at the contact points of doors and/or drawers of a piece of furniture. These bumpers are often formed from a soft material such as felt to protect the contact points on the piece of furniture from the repeated closing of the doors and/or drawers thereof.

While functional for their intended purposes, these prior art furniture glides and bumpers have certain limitations. More specifically, with respect to prior furniture glides, the repeated movement of a piece of furniture along a floor may cause premature wear of the felt disc due to the lack of rigidity and density thereof. Consequently, these prior furniture glides formed from felt discs may become detached from the bottoms of the pieces of furniture causing such bottoms to engage, and possibly damage, the flooring on which the pieces of furniture reside. With respect to prior bumpers, the felt members often loose their structural integrity due to the repeated contact with a corresponding door or drawer. This, in turn, may result in potential damage to the piece of furniture from the repeated contact of the door and/or drawer. In addition, the sound muffling properties of the bumper may be diminished.

Therefore, it is a primary object and feature of the present invention to provide a formed felt device that may be used as a bumper or as a furniture glide.

It is a further object and feature of the present invention to provide a formed felt device that is inexpensive to manufacture and simple to utilize.

It is a further object and feature of the present invention to provide a method for forming a felt device that may be used as a bumper to quiet the closing of a door and/or a drawer on a piece of furniture or as a furniture glide for mounting on the terminal end of a leg of a piece of furniture in order to prevent damage to the floor on which the piece of furniture resides.

In accordance with the present invention, a bumper is provided for protecting a contact point of a surface from engagement with an object. The bumper includes a shell having first and second ends, an outer surface, and an inner surface defining a passageway through the shell between the first and second ends. A resilient material is positioned in the passageway and extends between the first end and the second end of the shell.

The passageway intersects the first end of the shell at a first opening and intersects the second end of the shell at a second opening. The first opening and the second opening have diameters such that the diameter of the first opening is less than the diameter of the second opening. The inner surface of the shell includes a first generally conical portion extending from the first opening in the first end of the shell. In addition, the inner surface of the shell may also include a second generally conical portion extending from the second opening in the second end of the shell. A ring projects radially from the outer surface of the shell at a location adjacent to the second end.

Alternatively, the inner surface of the shell may be defined by first and second sidewalls and first and second end walls. The first and second sidewalls intersect the first end of the shell and diverge from each other. In addition, the first and second end walls intersect the first end of the shell and diverge from each other.

In accordance with a further aspect of the present invention, a bumper is provided for protecting a contact point of a surface from engagement with an object. The bumper includes a shell having a first end having an opening therein; a second end having an opening therein; an inner surface defining a passageway that interconnects the opening in the first end of the shell and the opening in the second end of the shell; and an outer surface. A resilient material is positioned in the passageway and extends between the first end and the second end of the shell.

The first opening and the second opening have diameters such that the diameter of the first opening is less than the diameter of the second opening. The inner surface of the shell includes a first generally conical portion extending from the first opening in the first end of the shell and a second generally conical portion extending from the second opening in the second end of the shell. A ring projects radially from the outer surface of the shell at a location adjacent to the second end.

Alternatively, the inner surface of the shell may be defined by first and second sidewalls and first and second end walls. The first and second sidewalls intersect the first end of the shell and diverge from each other. Similarly, the first and second end walls intersect the first end of the shell and diverge from each other.

In accordance with a still further aspect of the present invention, a method is provided for fabricating a bumper that protects a contact point of a surface from engagement with an object. The method includes the step of providing a quantity of pliable felt having a predetermined configuration and an outer surface. A predetermined stimulus is applied to a first portion of the felt so as to form a rigid outer shell from the felt. The outer shell has first and second ends, an outer surface, and an inner surface defining a center in the outer shell. A second portion of the felt within the center of outer shell remains pliable.

The felt is formed from a plurality of fibers and the step of applying the predetermined stimulus includes the additional step of increasing the density of the fibers of the first portion of the felt. By way of example, the step of applying the predetermined stimulus may include the additional step of heating an outer portion of the quantity of felt. The outer portion of the quantity of felt is heated to a temperature greater than 275 degrees Fahrenheit, preferably, in the range of 325 degrees Fahrenheit to 450 degrees Fahrenheit. Further, the step of applying the predetermined stimulus may include the additional step of decreasing the temperature of the quantity of felt to a predetermined value after the step of heating an outer portion of the quantity of felt. For example, the temperature of the quantity of felt may be decreased to a temperature of less than 200 degrees Fahrenheit.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is an isometric view of a bumper in accordance with the present invention;

FIG. 2 is a isometric view showing the bumper of FIG. 1 mounted on a piece of furniture;

FIG. 3 is a top plan view of the bumper of FIG. 1;

FIG. 4 is a cross-sectional view of the bumper of the present invention taken along line 4-4 of FIG. 3;

FIG. 5 is an isometric view of a furniture glide in accordance with the present invention;

FIG. 6 is a bottom plan view of the furniture glide of FIG. 5;

FIG. 7 is a cross-sectional view of the furniture of the present invention taken along line 7-7 of FIG. 6; and FIG. 8 is a isometric view showing the furniture glide of the present invention mounted on a terminal end of a leg of a piece of furniture.

DETAILED DESCRIPTION OF THE DRAWINGS

In accordance with the present invention, a bumper is generally designated by the reference numeral 10. Bumper 10 is formed entirely from foamed felt and is intended to be mounted adjacent a contact point of door 12 and a piece of furniture 14. However, other uses of bumper 10 are contemplated as being within the scope of the present invention. For example, bumper 10 may be used at the contact point of a drawer and a piece of furniture. In addition, bumper 10 may have various configurations without deviating from the scope of the present invention. An exemplary rectangular configuration of bumper 10 is hereinafter described.

Referring to FIGS. 1-4, by way of example, bumper 10 includes a generally rectangular, ring member 16 having inner edge 18 and outer peripheral edge 20. In addition, ring member 16 includes a generally flat upper face 22 and a generally flat lower face 24. Ring member 16 is further defined by first and second generally parallel end portions 26 and 28, respectively, interconnected by first and second generally parallel side portions 30 and 32, respectively. End walls 34 and 36 extend towards each other at an incline from inner edge 18 of ring 16 adjacent corresponding end portions 26 and 28, respectively. End walls 34 and 36 terminate at generally flat terminal ends 34a and 36a, respectively, that lie in a common plane. The thicknesses of end walls 34 and 36 increase as end walls 34 and 36 extend away from inner edge 18 of ring member 16 to add rigidity to bumper 10.

Bumper 10 further includes first and second sidewalls 38 and 40, respectively, which extend from inner edge 18 of ring member 16 adjacent corresponding side portions 30 and 32, respectively. Sidewalls 38 and 40 converge towards each other and terminate at generally flat terminal ends 38a and 40a that lie in a common plane with terminal ends 34a and 36a of end walls 34 and 36, respectively. The thicknesses of sidewalls 38 and 40 increase as sidewalls 38 and 40 extend away from inner edge 18 of ring member 16 to add rigidity to bumper 10. As best seen in FIG. 4, inner surfaces 42 and 44 of sidewalls 38 and 40, respectively, define a cavity for receiving foamed felt 46 therein. Felt 46 terminates at a lower surface that is generally co-planar with lower surface 24 of ring member 16 and at upper surface 50 that is generally co-planer with terminal ends 34a, 36a, 38a and 40a of end walls 34 and 36, respectively, and sidewalls 38 and 40, respectively. Adhesive 48 may be affixed to lower surface 24 of ring element 16, as well as, to the lower surface of felt 46 to facilitate the mounting of bumper 10 to door 12.

As best seen in FIG. 2, a plurality of bumpers 10 are affixed to inner surface 12a of door 12 of a piece of furniture 14 by means of adhesive 48. Each bumper 10 is positioned such that upper surface 50 of felt 46 overlaps a corresponding portion of furniture 14 that door 12 would contact when door 12 in its closed position.

In order to fabricate bumper 10, it is contemplated to provide a quantity of felt material 46. Preferably, felt 46 takes the form of a polyolephine fibrous material. Felt 46, having a predetermined configuration, is positioned within a mold corresponding in size and shape to bumper 10 to be formed. Heat of a predetermined temperature is applied to predetermined portions of felt 46 that corresponds to ring member 18, end walls 34 and 36, and sidewalls 38 and 40 of bumper 10. Preferably, the heat applied to the portions of felt 46 heretofore described is greater than 275° F., and preferably, in the range of 350° F. to 415° F. As the heat is applied to felt 46, the fibrous material begins to melt such that the fibers of felt 46 flow into one another and form a semi-solid skin that defines ring member 18, end walls 34 and 36, and sidewalls 38 and 40. The heat is removed from felt 46 and the temperature of felt 46 is allowed to cool to a predetermined temperature less than 200° F., and preferably, approximately 150° F. Once cooled, the portions of felt 46 are solidified thereby forming ring member 18, end walls 34 and 36, and sidewalls 38 and 40. Thereafter, bumper 10 is removed from the mold. It can be appreciated that during the heating process, the density of the fibers of felt 46 defining a ring member 18, end walls 34 and 36, and sidewalls 38 and 40 is increased thereby increasing the rigidity and durability of bumper 10.

Referring to FIGS. 5-7, a furniture glide in accordance with the present invention is generally designated by the reference numeral 52. Furniture glide 52 is formed entirely from foamed felt and is intended to be mounted on terminal end 54a of leg 54 of a piece of furniture, FIG. 8. However, other uses of furniture glide 52 are contemplated as being within the scope of the present invention. For example, furniture glide 52 may be mounted directly on the bottom of a piece of furniture. In addition, furniture glide 52 may have various configurations without deviating from the scope of the present invention. An exemplary circular configuration of furniture glide 52 is hereinafter described.

By way of example, furniture glide 52 includes a generally circular ring member 56 having inner edge 58 and outer peripheral edge 60. In addition, ring member 56 includes a generally flat upper surface 62 and a generally flat lower surface 64. A generally conical shaped sidewall 66 depends from inner edge 58 of ring member 56 away from lower surface 64. Sidewall 66 terminates at a generally flat terminal end 68. As best seen in FIG. 7, the thickness of sidewall 66 increases as sidewall 66 extends away from inner edge 58 of ring member 56 so as to provide rigidity to furniture glide 52.

Inner surface 70 of sidewall 66 defines a cavity for receiving foamed felt 72 therein. Felt 72 terminates at an upper surface that is generally co-planar with upper surface 62 of ring member 56 and at lower surface 74 that is generally co-planar with terminal end 68 of sidewall 66. Adhesive 76 may be provided on upper surface 62 of ring member 56, as well as, on the upper surface of felt 72 to facilitate the mounting of furniture glide 52 on terminal end 54a of furniture leg 54.

In order to interconnect furniture 52 to terminal end 54a of furniture leg 54, furniture glide 52 is positioned adjacent terminal end 54a of furniture leg 54 to such that adhesive 76 attaches furniture glide 52 to terminal end 54a of furniture leg 54. With furniture glide 52 mounted on terminal end 54a of furniture leg 52, lower surface 74 of felt 72 is engageable with a supporting surface such as a floor or the like, thereby protecting the supporting surface from potential damage from furniture leg 54.

Furniture glide 52 is formed in the same manner as heretofore described with respect to bumper 10. As such, the methodology used to fabricate bumper 10 may be considered to describe the fabrication process of furniture glide 52 as if fully described herein. As such, it can be appreciated that by positioning felt 72 in a mold and heating the outer surface thereof, ring member 56 and sidewall 66 of furniture glide 52 are formed. During the heating process, the density of the felt fibers defining ring member 56 and sidewall 66 increases thereby increasing the rigidity and durability of furniture glide 52.

Various modes of carrying out the invention are contemplated as being within the scope of the following claims particularly pointing out and distinctly claiming the subject matter that is regarded as the invention.

I claim:

1. A method of fabricating a bumper that protects a contact point of a surface from engagement with an object, comprising the steps of:
    providing a quantity of pliable felt having a predetermined configuration and an outer surface; and
    applying a predetermined stimulus to a first portion of the felt so as to form a rigid outer shell from the felt, the outer shell including:
        a ring having an inner edge and lying in a first plane; and
        a sidewall projecting from the inner edge of the ring and having an inner surface, the sidewall at least partially defining a tubular structure extending along an axis generally perpendicular to the first plane;
    wherein:
        the sidewall of the outer end has first and second opposite ends and a thickness;
        the thickness of the sidewall at the first end being less than the thickness of the sidewall at the second end;
        the inner surface of the sidewall and the inner edge of the ring defining a center;
        a second portion of the felt within the center of outer shell remains pliable.

2. The method of claim 1 wherein the felt is formed from a plurality of fibers and wherein the step of applying the predetermined stimulus includes the additional step of increasing the density of the fibers of the first portion of the felt.

3. The method of claim 1 wherein the step of applying the predetermined stimulus includes the additional step of heating an outer portion of the quantity of felt.

4. The method of claim 3 wherein the outer portion of the quantity of felt is heated to a temperature greater than 275 degrees Fahrenheit.

5. The method of claim 4 wherein the outer portion of the quantity of felt is heated to a temperature in the range of 325 degrees Fahrenheit to 450 degrees Fahrenheit.

6. The method of claim 5 wherein the step of applying the predetermined stimulus includes the additional step of decreasing the temperature of the quantity of felt to a predetermined value after the step of heating an outer portion of the quantity of felt.

7. The method of claim 6 wherein the temperature of the quantity of felt is decreased to a temperature of less than 200 degrees Fahrenheit.

8. A method of fabricating a bumper having a configuration, comprising the steps of:
    positioning a fibrous material into a mold, the mold corresponding in size and shape to the configuration of the bumper;
    applying heat to an outer periphery of the fibrous material such that the outer periphery of the fibrous material melts; and
    cooling the fibrous material such that the melted outer periphery of the fibrous material solidifies and forms an outer shell, the outer shell including:
        a ring having an inner edge and lying in a plane; and
        a sidewall projecting from the inner edge of the ring and having a first end, a second end, an inner surface and a thickness, the sidewall at least partially defining a tubular structure extending along an axis generally perpendicular to the plane;
    wherein:
        the inner edge of the ring and the inner surface of the sidewall defining a central passageway through the outer shell;
        the thickness of the sidewall at the first end being less than the thickness of the sidewall at the second end; and
        the fibrous material within the central passageway remains pliable.

9. The method of claim 8 wherein the fibrous material is felt.

10. The method of claim 8 wherein the heat applied to the outer periphery of the fibrous material has a temperature greater than 275 degrees Fahrenheit.

11. The method of claim 8 wherein the heat applied to the outer periphery of the fibrous material has a temperature in the range of 325 degrees Fahrenheit to 450 degrees Fahrenheit.

12. The method of claim 8 wherein the fibrous material is cooled to a temperature less than 200 degrees Fahrenheit.

13. A method of fabricating a bumper having a configuration, comprising the steps of:
    positioning a pliable material in a mold, the pliable material having an outer surface;
    applying heat to the outer surface of the pliable material such that a first portion of the pliable material melts and a second portion of the pliable material remains pliable; and
    cooling the pliable material such that the first portion of the pliable material solidifies and forms a shell, the shell including:
        a ring having an inner edge and lying in a plane; and
        a sidewall projecting from the inner edge of the ring and having a thickness, a first end, a second end and an inner surface, the sidewall at least partially defining a tubular structure extending along an axis generally perpendicular to the first plane;
    wherein:
        the inner edge of the ring and the inner surface of the sidewall defining a central passageway through the outer shell;
        the thickness of the sidewall at the first end being less than the thickness of the sidewall at the second end; and
        the central passageway in the shell receives the second portion of the pliable material therein.

14. The method of claim 13 wherein the pliable material is a polyolephine fibrous material.

15. The method of claim 13 wherein the outer surface of the pliable material is heated to a temperature greater than 275 degrees Fahrenheit.

16. The method of claim 13 wherein the outer surface of the pliable material is heated to a temperature in the range of 325 degrees Fahrenheit to 450 degrees Fahrenheit.

17. The method of claim 13 wherein the pliable material is cooled to a temperature less than 200 degrees Fahrenheit.

* * * * *